Patented Oct. 16, 1923.

1,471,150

UNITED STATES PATENT OFFICE.

KAROL DZIEWOŃSKI, OF CRACOW, POLAND.

PROCESS FOR THE PREPARATION OF DYESTUFFS.

No Drawing. Application filed March 3, 1921. Serial No. 449,590.

*To all whom it may concern:*

Be it known that I, KAROL DZIEWOŃSKI, a citizen of the Polish Republic, residing at Cracow, Poland, have invented a Process for the Preparation of Dyestuffs, of which the following is a specification.

It is known from the investigations of K. Dziewoński and others, that by the action of sulphur on acenaphthenes or its derivatives strongly coloured compounds are formed, for instance the red dinaphthylenethiophene $C_{24}H_{12}S$.

I have now found that the dinaphthylenethiophene is easily converted into dyestuffs by treating the same under different conditions with ordinary or fuming sulphuric acid. Besides the principal reaction, i. e., the sulphonation complicated secondary reactions accompanied by oxidation take place, the products of which have proved as excellent acid dyestuffs or direct sulphur-dyestuffs. In this manner I found the surprising and unexpected fact, that the compounds formed, being highly coloured but possessing no autochromic groups are changed by the action of sulphuric acid into beautiful, direct and fast dyestuffs.

Example.

10 parts of dinaphthylenethiophene are heated with 40 parts of concentrated and 2 parts of fuming (20%) sulphuric acid up to 100–110° C. for 8 hours. The reaction takes place with the liberation of large quantities of sulphur dioxide, the formation of three different products taking place, viz—an amorphous violet-black compound insoluble in water and two red or brown coloured sulphuric acids of dinaphthylenethiophene respectively, which are differentiated by the solubility of their barium and calcium salts. The sulphonated mixture is diluted with water and the sulpho-acids soluble in water are separated by filtration from the insoluble product of reaction. The reddish brown coloured filtrate is treated with milk of lime or barium carbonate until it shows a neutral reaction, whereupon the calcium sulphate mixed with the little soluble salt of the other product of the sulphonation is filtered from the brownish red solution of the easily soluble calcium salt. The soluble salt can be recovered by concentrating the solution and boiling down to dryness. It forms a Bordeaux-red crystalline substance, being according to its composition the salt of a trisulphonic acid of oxydinaphthylenethiophene and dyes wool in an acid bath scarlet or orange red.

The other calcium salt which is difficultly soluble in water and has been precipitated along with calcium sulphate can be brought into solution by extracting the precipitate with a dilute solution of sodium carbonate, being thereby converted in its sodium salts. In its dry state it form a dark brown amorphous powder, that gives wool a reddish brown colour. That product, a polysulphopolyoxy derivative of dinaphthylenethiophene is nearly exclusively formed by sulphonating at a higher temperature than 100° or with fuming sulphuric acid.

The black-violet substance which is little soluble in water and caustic alkaline solutions and is formed on sulphonating dinaphthylenethiophene along with the two other sulphonic acids, is soluble in a solution of sodium sulphide with a reddish violet colour. That solution dyes unmordanted cotton grey-violet and is employed as a direct sulphur dyestuff.

What I claim is:—

1. A process for the preparation of dyestuffs, consisting in treating dinaphthylenethiophene with sulphuric acid.

2. A process for the preparation of dyestuffs, consisting in heating 10 parts of dinaphthylenethiophene with 40 parts of concentrated and two parts of fuming sulphuric acid for 8 hours, diluting the sulphonated mixture in water, separating by filtration the sulpho-acids soluble in water from the insoluble products of reaction, neutralizing the reddish-brown product with milk of lime, separating by the filtration the soluble calcium salt from the insoluble calcium salt, concentrating the solution and boiling down to dryness.

3. A process for the preparation of dyestuffs, consisting in heating 10 parts of dinaphthylenethiophene with 40 parts of concentrated and two parts of fuming sulphuric acid for 8 hours, diluting the sulphonated mixture in water, separating by filtration the sulpho-acids soluble in water from the insoluble products of reaction, neutralizing the reddish-brown product with milk of lime, separating by the filtration the soluble calcium salt from the insoluble calcium salt, extracting the precipitated difficultly soluble calcium salt by a dilute solution of sodium carbonate and drying the hereby obtained sodium salt.

In testimony whereof I have signed my name to this specification.

KAROL DZIEWOŃSKI.

Witnesses:
WLADYSKER STEFANOSKY,
ALEXANDER FYLAKWICZ.